(12) United States Patent
Matsuzaki et al.

(10) Patent No.: US 7,359,511 B2
(45) Date of Patent: Apr. 15, 2008

(54) ENCRYPTION TRANSMISSION SYSTEM

(75) Inventors: Natsume Matsuzaki, Minou (JP);
Makoto Tatebayashi, Takarazuka (JP);
Toshiro Nishio, Hirakata (JP);
Hidekazu Suzuki, Yamatokooriyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 753 days.

(21) Appl. No.: 10/203,510

(22) PCT Filed: Dec. 18, 2001

(86) PCT No.: PCT/JP01/11104

§ 371 (c)(1),
(2), (4) Date: Dec. 2, 2002

(87) PCT Pub. No.: WO02/51150

PCT Pub. Date: Jun. 27, 2002

(65) Prior Publication Data

US 2003/0145336 A1 Jul. 31, 2003

(30) Foreign Application Priority Data

Dec. 18, 2000 (JP) ............................ 2000-383345

(51) Int. Cl.
*H04N 7/167* (2006.01)
*H04N 7/12* (2006.01)
(52) U.S. Cl. .................... 380/212; 380/210; 348/435.1
(58) Field of Classification Search ................ 380/212; 348/435.1
See application file for complete search history.

(56) References Cited

U.S. PATENT DOCUMENTS

| 4,742,543 A | * | 5/1988 | Frederiksen | ............... 380/237 |
| 5,091,936 A | * | 2/1992 | Katznelson et al. | ........ 380/237 |
| 5,173,775 A | * | 12/1992 | Walker | ....................... 348/470 |
| 5,475,498 A | * | 12/1995 | Radice | ....................... 386/112 |
| 5,646,999 A | | 7/1997 | Saito | |
| 5,740,246 A | | 4/1998 | Saito | |

(Continued)

FOREIGN PATENT DOCUMENTS

CN 1123076 5/1996

(Continued)

OTHER PUBLICATIONS

Marc McConnaughey, entitled "*A Digital-Interface Standard for Displays the DVI Initiative is Already Changing CRTs for the Better and is Destined to Promote the Growth of Flat-Panel Monitors*", Information Display, Palisades Institute for Research Services, vol. 16, No. 1, Jan. 2000, pp. 18-21.

(Continued)

*Primary Examiner*—Gilberto Barron, Jr.
*Assistant Examiner*—Virgil Herring
(74) *Attorney, Agent, or Firm*—Wenderoth, Lind & Ponack, L.L.P.

(57) ABSTRACT

A video signal and an audio signal are time division multiplexed, encrypted, and transmitted. A transmission side time-compresses the audio signal, multiplexes, encrypts, and transmits the time-compressed audio signal in a blanking period of the video signal. Control is performed using an audio signal data enable signal ADE, and an audio signal/video signal switch signal.

18 Claims, 12 Drawing Sheets

U.S. PATENT DOCUMENTS

| | | | |
|---|---|---|---|
| 5,867,579 A | 2/1999 | Saito | |
| 5,974,141 A | 10/1999 | Saito | |
| 6,002,772 A | 12/1999 | Saito | |
| 6,069,952 A | 5/2000 | Saito et al. | |
| 6,076,077 A | 6/2000 | Saito | |
| 6,097,818 A | 8/2000 | Saito | |
| 6,128,605 A | 10/2000 | Saito et al. | |
| 6,182,218 B1 | 1/2001 | Saito | |
| 6,272,635 B1 | 8/2001 | Saito | |
| 6,408,390 B1 | 6/2002 | Saito | |
| 6,424,715 B1 | 7/2002 | Saito | |
| 6,438,694 B2 | 8/2002 | Saito | |
| 6,449,717 B1 | 9/2002 | Saito | |
| 6,463,536 B2 | 10/2002 | Saito | |
| 6,721,887 B2 | 4/2004 | Saito | |
| 6,741,991 B2 | 5/2004 | Saito | |
| 6,744,894 B1 | 6/2004 | Saito | |
| 6,789,197 B1 | 9/2004 | Saito | |
| 7,036,019 B1 | 4/2006 | Saito | |
| 2001/0013021 A1 | 8/2001 | Saito | |
| 2001/0027522 A1 | 10/2001 | Saito | |
| 2001/0036193 A1 | 11/2001 | Kori | |
| 2002/0021807 A1 | 2/2002 | Saito | |
| 2002/0025044 A1 | 2/2002 | Saito | |
| 2002/0052850 A1 | 5/2002 | Saito | |
| 2002/0059238 A1 | 5/2002 | Saito | |
| 2002/0112173 A1 | 8/2002 | Saito | |
| 2002/0178372 A1 | 11/2002 | Saito | |
| 2003/0012385 A1 | 1/2003 | Saito | |
| 2003/0123556 A1* | 7/2003 | Komori | 375/240.26 |
| 2003/0144963 A1 | 7/2003 | Saito | |
| 2005/0262023 A1 | 11/2005 | Saito | |
| 2006/0282674 A1 | 12/2006 | Saito | |
| 2007/0033143 A1 | 2/2007 | Saito | |
| 2007/0038575 A1 | 2/2007 | Saito | |

FOREIGN PATENT DOCUMENTS

| | | | |
|---|---|---|---|
| EP | 0 677 949 | | 10/1995 |
| EP | 0 704 785 | | 4/1996 |
| EP | 0 709 760 | | 5/1996 |
| EP | 0 715 241 | | 6/1996 |
| EP | 0 719 045 | | 6/1996 |
| EP | 1 130 917 | | 9/2001 |
| EP | 1 133 163 | | 9/2001 |
| EP | 1 691 315 | | 8/2006 |
| EP | 1 691 316 | | 8/2006 |
| EP | 1 710 997 | | 10/2006 |
| EP | 1 722 548 | | 11/2006 |
| JP | 07-271865 | | 10/1995 |
| JP | 08-185448 | | 7/1996 |
| JP | 08-272745 | | 10/1996 |
| JP | 08-287014 | | 11/1996 |
| JP | 08-288940 | | 11/1996 |
| JP | 11331732 A | * | 11/1999 |
| JP | 2001-251385 | | 9/2001 |
| JP | 2003-242286 | | 8/2003 |
| JP | 2003-250136 | | 9/2003 |
| JP | 2004-072792 | | 3/2004 |
| JP | 2004-303265 | | 10/2004 |
| JP | 2006-085725 | | 3/2006 |
| JP | 2006-180562 | | 7/2006 |
| JP | 2006-325246 | | 11/2006 |
| WO | 95/19668 | | 7/1995 |
| WO | 00 14626 | | 3/2000 |

OTHER PUBLICATIONS

Marc McConnaughey, entitled "*A Digital Visual Interface DVI*", Paper Digital Display Working Group, Apr. 2, 1999, pp. 1-76.

Silicon Image, White Paper, "High-bandwidth Digital Content Protection", pp. 1-11, Feb. 2000.

\* cited by examiner

ENCRYPTION TRANSMISSION SYSTEM

TECHNICAL FIELD

The present invention relates to an encryption transmission system that encrypts digital video signals and audio signals, and transmits the encrypted signals.

BACKGROUND ART

When an analog signal is transmitted to an LCD (Liquid Crystal Display Device), a CRT (Cathode Ray Tube), or the like, distortions in the wave form and the like generate blurring and ghosting on the display screen.

DVI Specification

In order to solve the above-described problem, in the DVI (Digital Visual Interface) Standard, video signals are sent digitally to LCDs, CRTs, and the like. This enables a screen to be displayed with high picture quality and without distortion.

Conventional signal transmission systems to which the DVI specification is applied are composed of a transmission device and a reception device which are connected via a transmission path. The transmission device has three TDMS (Transition Minimized Differential Signaling) encoders/serializers, and the reception device has three TDMS recovery/decoders. Component signals of each of RED, GREEN, and BLUE are input into the respective corresponding TDMS encoder/serializers, encoded therein, and the results are serialized and output to the transmission path. Next, each of the TDMS recovery/decoders in the reception device decodes the respective received signal, and recovers and reconstructs the respective component signal.

A DE (data enable) signal shows a period in which component signals RED, GREEN, BLUE, etc. exist, and is HIGH active. A period in which the DE signal is LOW is, for example, a horizontal synchronization signal period or a vertical synchronization signal period. CLT signals CTL0, CLT1, CTL2, and CLT3 are provided as control signals, but in the current DVI specification these signals are unused. Specifically, ordinarily the level of these signals is zero.

Each of the TMDS encoder/serializers in the transmission device converts an input 8-bit signal into 10 bits, and serializes and sends the converted 10-bit video signal in serial to the transmission path. The purpose of converting from 8 bits to 10 bits is that a 10-bit signal is suitable for high-speed transmission of data with fewer data change points. In addition, the TDMS encoder/serializers convert the 2-bit control signal to 10 bits and transmit the result to the transmission path. The data enable signal is also encoded, serialized and transmitted to the transmission path. The TDMS recovery/decoders in the reception device decode and expand the 10-bit serial data received from the transmission path into 8-bit color signals, a 2-bit data enable signal, and a 2-bit control signal.

HDCP Specification

An HDCP (High-bandwidth Digital Content Protection System) specification has been proposed as a digital content protection system that is compatible with the DVI specification.

The HDCP specification uses a signal transmission system that is compatible with the DVI specification to transmit video content requiring right protection. Essentially the HDCP specification consists of authentication between the transmission device and the reception device, sharing of a key, and encryption of video content over a communication path.

A transmission device in a signal transmission system that complies with the HDCP specification has an authentication unit that performs authentication and key exchange with the reception unit, an encryption unit that encrypts video information using a shared key, and a TMDS encoding unit. A reception unit has an authentication unit that performs authentication and key exchange with the transmission unit, a TDMS decoding unit, and a decryption unit that decrypts a received signal using the shared key.

According to this construction, after verification and key exchange via an $I^2C$ between the transmission device and the reception device, the transmission device encrypts video RGB data, and transmits the encrypted data via a TDMS encoder that complies with the DVI specification. After receiving the encrypted data via a TMDS decryption unit that complies with the DVI specification, the reception unit decrypts the encrypted video RGB data using the same key as that used by the transmission device, to obtain the original video RGB signal. In the HDCP specification the encryption used here is called "HDCP Cipher". The core part of HDCP Cipher is common to authentication, key exchange, and video data encryption.

As explained above, a data transmission system that is compatible with DVI specifications and HDCP specifications enables transmission of high quality images while ensuring protection of right protected works over the transmission path.

In recent years it has become common to reproduce digital video to which digital audio is attached in personal computers, digital broadcast reception devices, DVD (Digital Versatile Disk) reproduction devices, and the like. Accordingly, there is now a demand for high-quality transmission of audio, similar to that described above for video.

SUMMARY OF THE INVENTION

In order to respond to the aforementioned demands, the object of the present invention is to provide a transmission system, a transmission device, a reception device, a video generation device, and a video display device that are capable of transmitting video information and audio information with high quality.

In order to achieve the above described object, the present invention is a transmission system including: a transmission device and a reception device, the transmission device transmitting digital video information while providing one or more blanking intervals during transmission of the digital video information, and the reception device receiving the digital video information, wherein the transmission device transmits digital audio information during the one or more blanking intervals, and the reception device receives the digital audio information during the one or more blanking intervals.

According to the above-described transmission system, video information and audio information can be transmitted with high picture quality.

Furthermore, the present invention is a transmission system including: a video transmission device and a video display device, the video transmission device encrypting and transmitting frame information that includes digital video information while providing one or more blanking intervals during the frame information, and the video display device receiving and decrypting the encrypted frame information, extracting the digital video information from the decrypted frame information, and displaying the extracted video information, wherein in the one or more blanking intervals the video transmission device multiplexes digital audio information with the frame information, encrypts the multiplexed frame information with which the digital audio information has been multiplexed, and transmits the encrypted frame information, and the video display device receives the encrypted frame information, decrypts the received encrypted frame information to generate frame information, extracts the digital audio information from the one or more blanking intervals provided in the generated frame information, and converts the extracted digital audio information to an audio signal.

According to the above described transmission system, video information and audio information can be transmitted with high picture quality while being protected as right protected works.

BEST MODE FOR CARRYING OUT THE INVENTION

The following describes a personal computer system 10 as a first embodiment of the present invention.

1. Structure of the Personal Computer System 10

Figure 1:
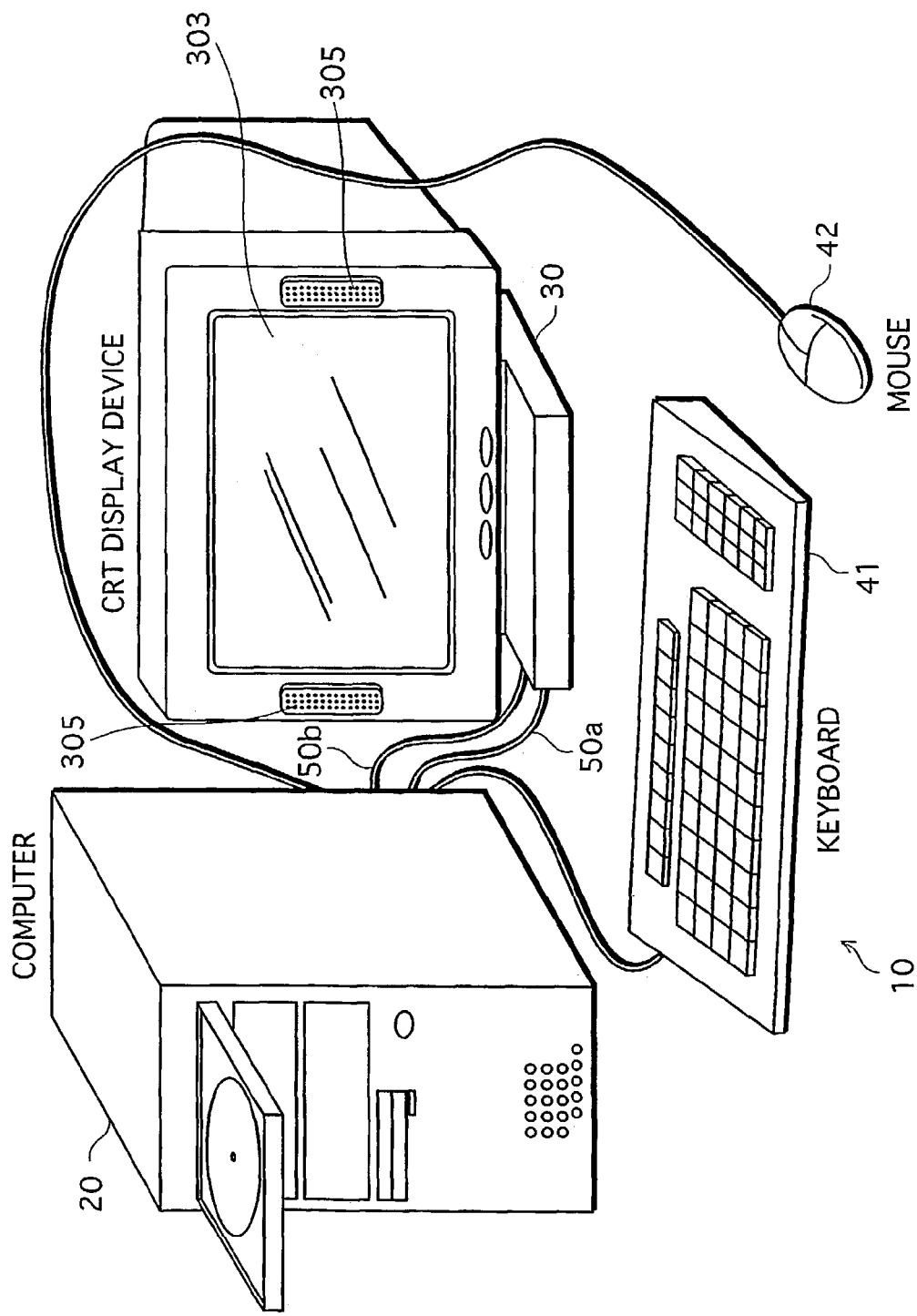
FIG. 1 is an outline of a personal computer system 10.

As shown in FIG. 1, the personal computer system 10 is composed of a computer 20, a CRT display device 30, a keyboard 41, and a mouse 42. The computer 20 and the CRT display device 30 are connected by cables 50a and 50b.

Figure 2:
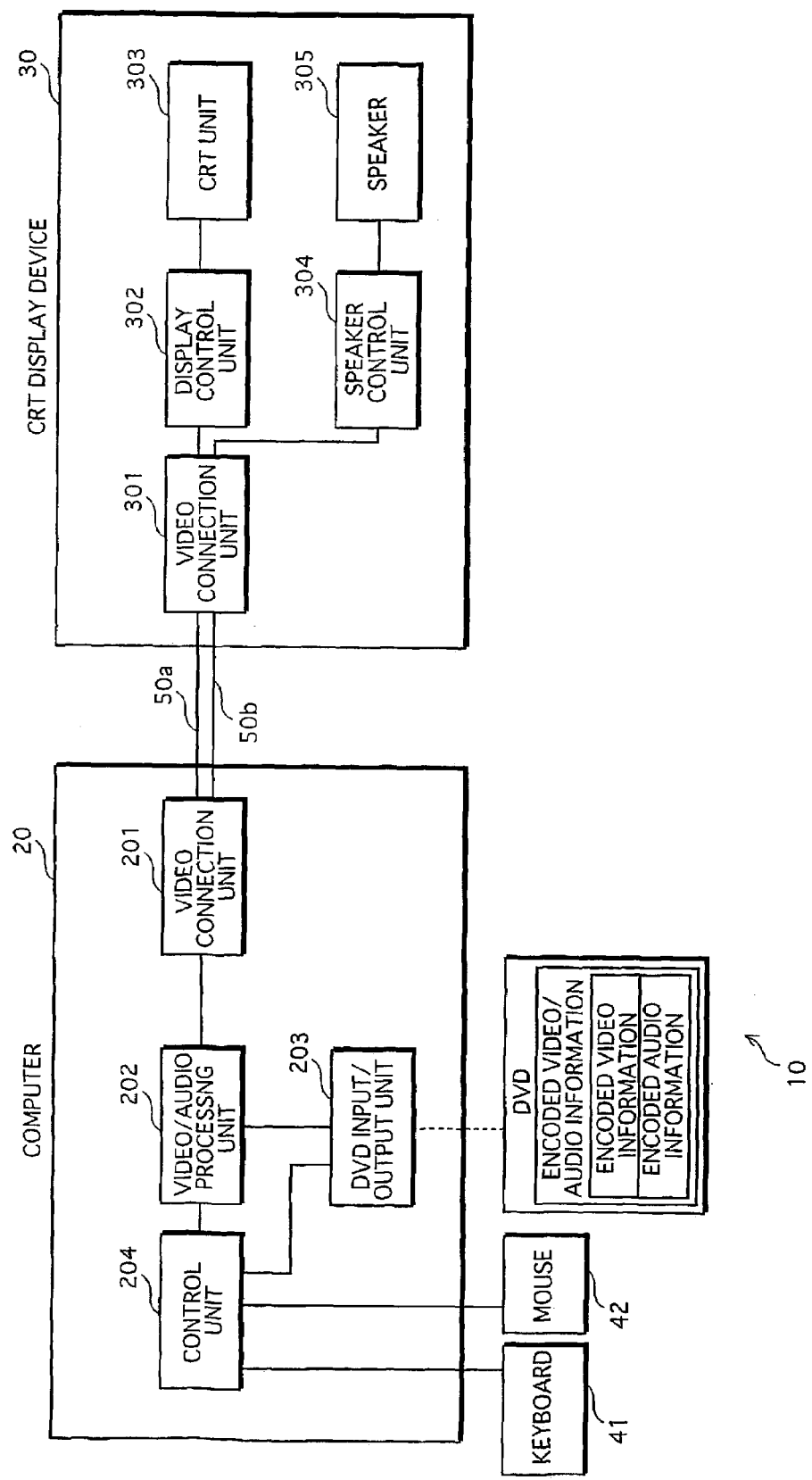
FIG. 2 is a block drawing showing the structure of the personal computer system 10.

Furthermore, as shown in FIG. 2, the computer 20 is composed of a video connection unit 201, a video/audio processing unit 202, a DVD input/output unit 203, a control unit 204, and other units that are not illustrated. The computer 20 also includes a microprocessor, a ROM (read only memory), a RAM (random access memory), a hard disk unit, and so on. Computer programs are stored in the RAM and the hard disk unit. The computer 20 performs its functions according to operations of the microprocessor following the computer programs.

The CRT display device 30 is composed of a video connection unit 301, a display control unit 302, a CRT unit 303, a speaker control unit 304, and speakers 305.

Figure 3:
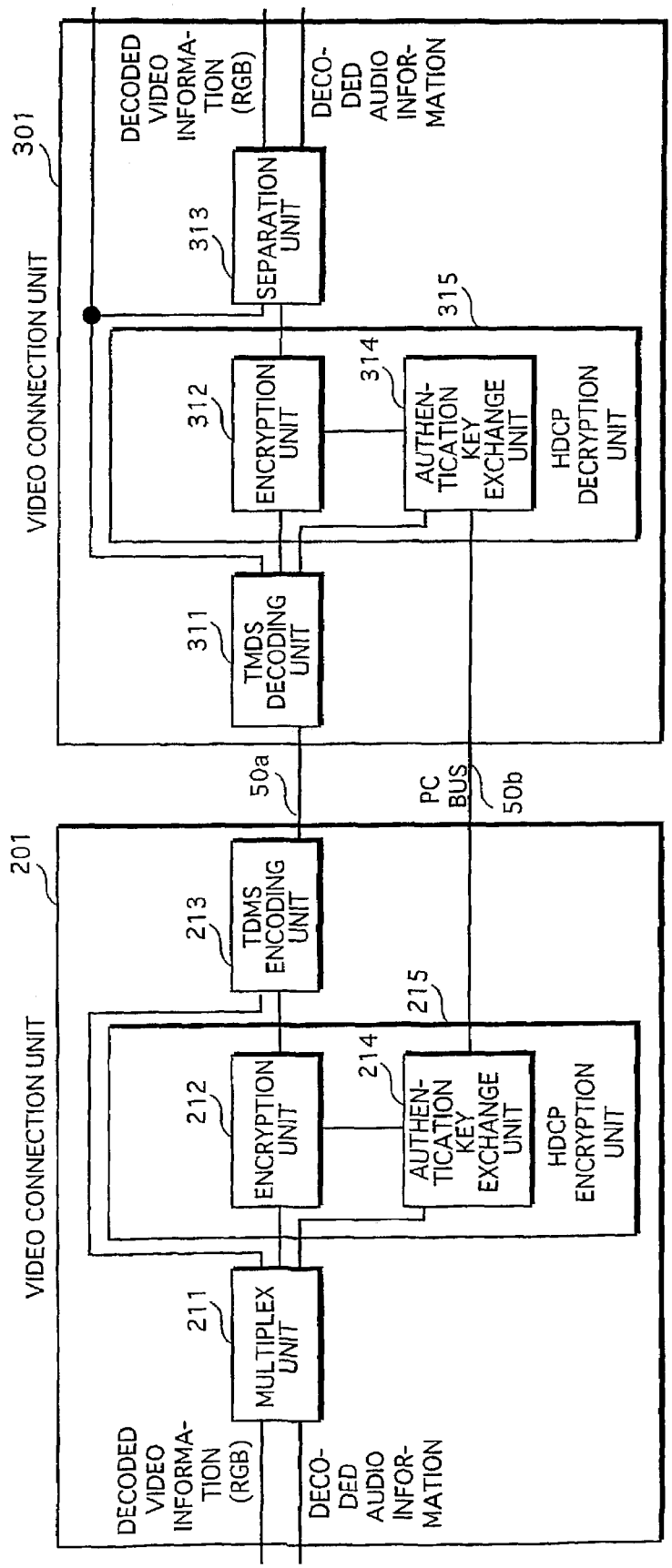
FIG. 3 is a block drawing showing the structure of a video connection unit 201 and a video connection unit 301.

As shown in FIG. 3, the video connection unit 201 is composed of a multiplex unit 211, an HDCP encryption unit 215, and a TDMS encoding unit 213. The HDCP encryption unit 215 includes an encryption unit 212 and an authentication key exchange unit 214. As shown in FIG. 3, the video connection unit 301 is composed of a TMDS decoding unit 311, an HDCP decryption unit 315 and a separation unit 313. The HDCP decryption unit 315 includes an encryption unit 312 and an authentication key exchange unit 314.

The DVD stores encoded video/audio information composed of encoded video information and encoded audio information. Here, the encoded video information is video information that has been compressed and encoded, while the encoded audio information is audio information that has been compressed and encoded. One example of the audio/video information is movie information composed of moving images and audio information. The DVD is placed in the DVD input/output unit 203 by a user.

The computer 20 reads encoded video/audio information from the DVD that has been placed in computer 20, and separates the read encoded video/audio signal to generate the encoded video information and the encoded audio information. Next, the computer 20 decodes the encoded video information to generate decoded video information. Here, the decoded video information and the encoded audio information are digital signals. Next, the computer 20 encrypts the decoded video information and the encoded audio information to generate encrypted video information and encrypted audio information, respectively. The computer 20 then outputs the generated encrypted video information and the generated encrypted audio information via the cable 50a to the CRT display device 30. The CRT display device 30 decrypts the received encrypted video information and the received encrypted audio information to generate decrypted video information and decrypted audio information, displays the generated decrypted video information on the CRT unit 303, and converts the generated decrypted audio information to an analog signal which is output by the speakers 305.

1.1 Keyboard 41, Mouse 42, Control Unit 204, DVD Input/Output Unit 203, and Video/Audio Processing Unit 202

The keyboard 41 and the mouse 42 receive an instruction from the user to reproduce the encoded video/audio information recorded on the DVD, generate instruction information corresponding to the received instruction, and output the generated instruction information to the control unit 204.

The control unit 204 receives the instruction information, and outputs an instruction, based on the received instruction information, to the DVD input/output unit 203 to read the encoded video/audio information.

The DVD input/output unit 203 receives the read instruction, reads the encoded video/audio information from the DVD based on the received read instruction, and outputs the read encoded video/audio information to the video/audio processing unit 202.

The video/audio processing unit 202 receives the encoded video/audio information which it separates to generate the encoded video information and the encoded audio information. Then, the video/audio processing unit 202 decodes the generated encoded video information to generate decoded video information, and outputs the generated decoded video information and the generated encoded audio information to the video connection unit 201.

1.2 Video Connection Unit 201.

(1) Multiplex Unit 211

The multiplex unit 211 receives decoded video information and encoded audio information.

The decoded video information includes a plurality of pieces of frame video information, each of which corresponds to one frame. Moving images are expressed by displaying the plurality of pieces of frame video information in succession on the CRT display device 30. Each piece frame video information includes 480 pieces of line video information which together correspond to one line.

The encoded audio information includes frame audio information that corresponds to the frame video information. The frame audio information is converted into audio and output in the time slot in which the corresponding frame video information is being reproduced in the CRT display device 30. Each piece of frame audio information includes 480 pieces of line audio information that correspond to the pieces of line video information.

The multiplex unit 211, when transmitting one piece of frame video information from amongst the decoded video information from the computer 20 to the CRT display device 30, provides a vertical retrace period (also called a "vertical blanking interval") directly before the frame video information is transmitted. This is for establishing synchronization between the computer 20 and the CRT display device 30 for displaying the frame video information. Here, the vertical retrace period includes a time at which a predetermined number of vertical synchronization signals are transmitted. Next, the multiplex unit 211 provides a horizontal retrace period (also called a "horizontal blanking interval") directly before transmitting the pieces of line video information. This is for establishing synchronization for displaying the pieces of line video information included in each piece of frame video information. Here, the horizontal retrace period includes a time at which a horizontal synchronization signal is transmitted.

Figure 4:
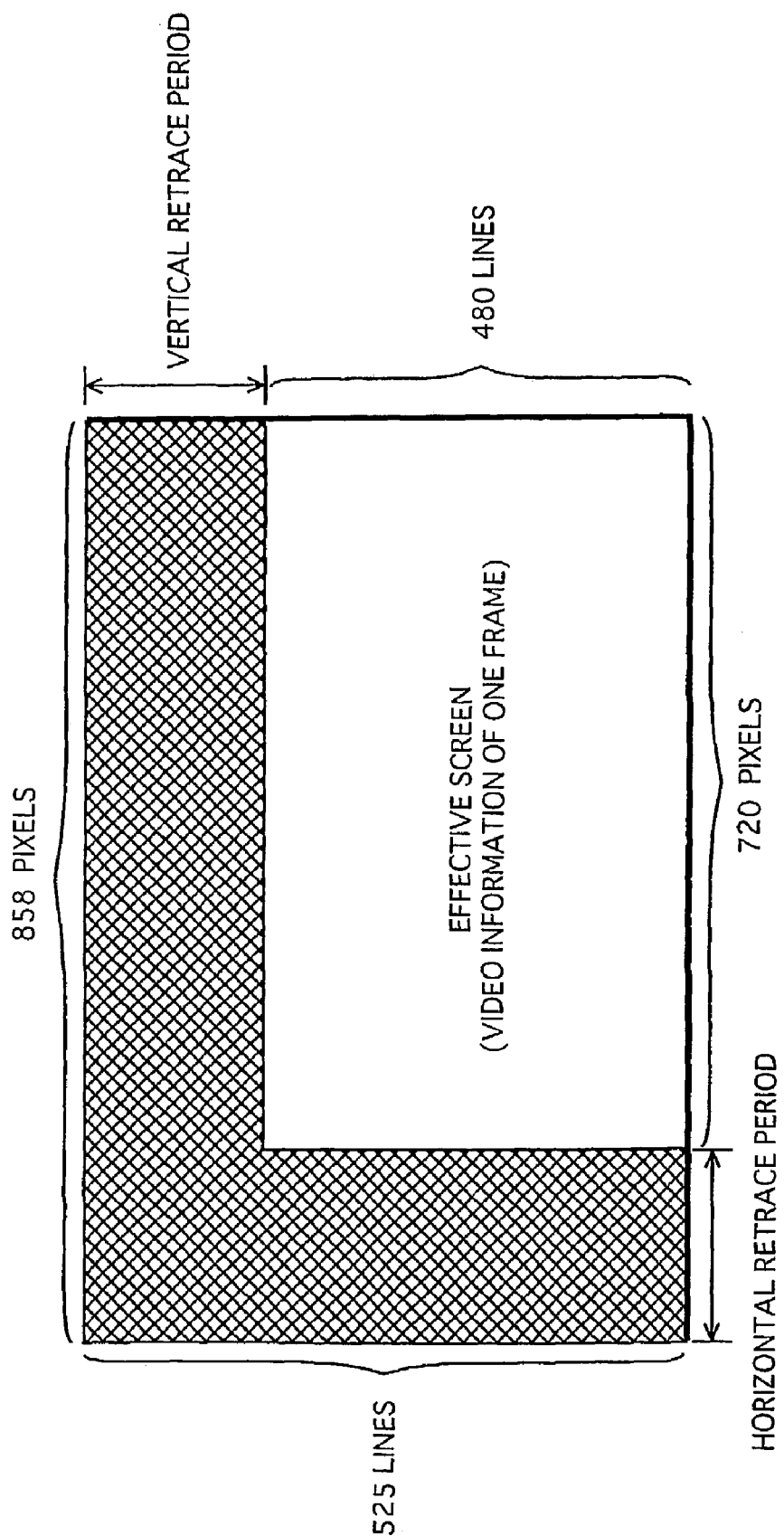
FIG. 4 is an outline drawing showing the relationship between a vertical retrace period, a horizontal retrace period, and one frame of video information.

FIG. 4 shows the relationship between the vertical retrace period, the horizontal retrace period, and one piece of frame video information. As shown in the figure, each piece of frame video information is composed of 480 pieces of line video information, and each piece of video line information is composed of 720 pixels. Furthermore, each pixel has 24 bits, the 24 bits including 8-bit component information for each of RED, GREEN, and BLUE. As shown in the figure, the multiplex unit 211 provides, as a vertical retrace period, a time slot as a vertical retrace period directly before transmitting the piece of frame video. This time slot is equivalent to transmitting 45 pieces of line video information. Next, the multiplex unit 211 provides, as a horizontal retrace period, a time slot directly before transmitting each piece of line video information. This time slot is equivalent to transmitting 138 pixels.

Figure 5:
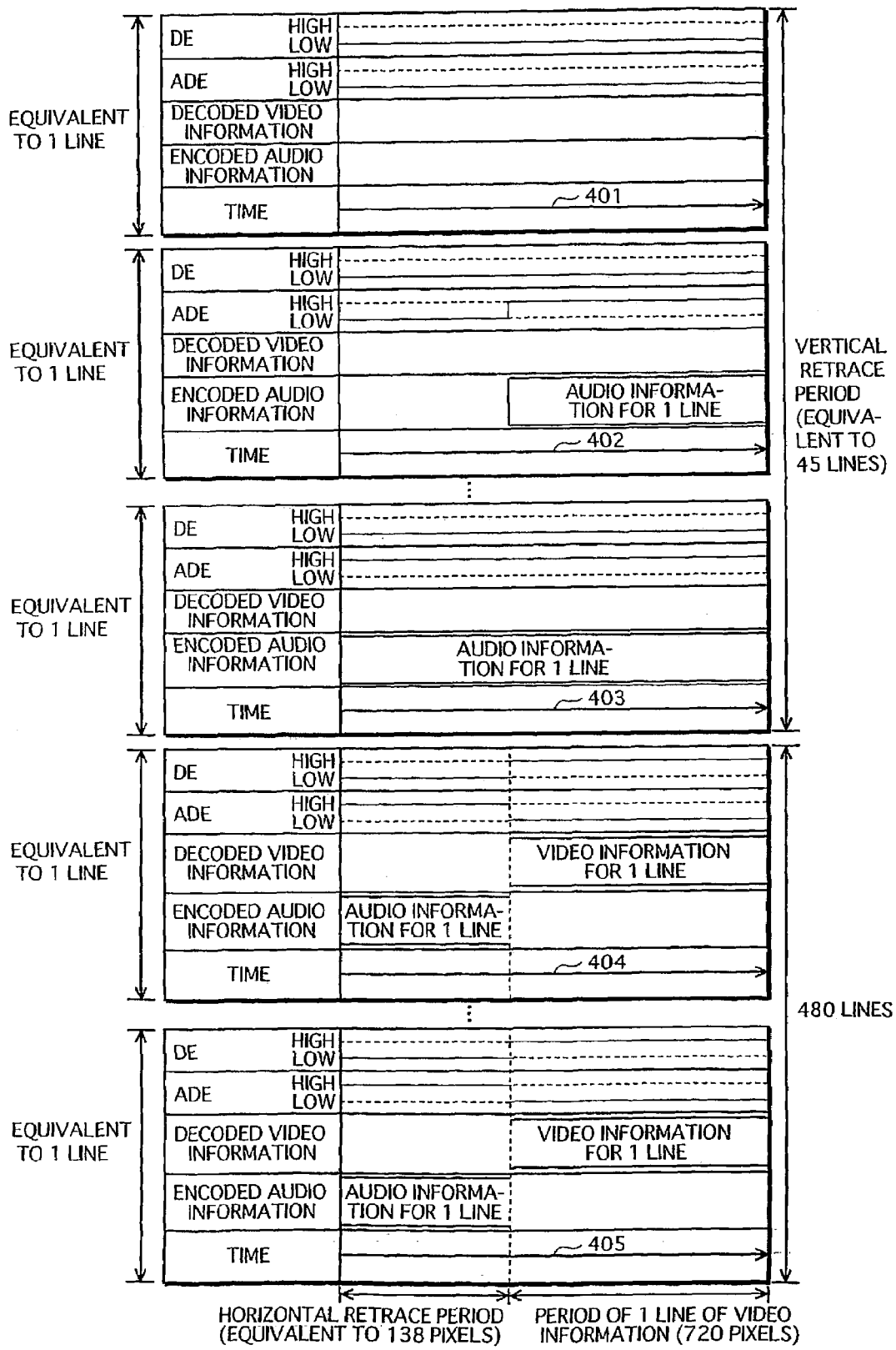
FIG. 5 shows changes in one frame of data enable signals DE and ADE, decoded video information, and encoded audio information, as time elapses.

As shown in FIG. 5, at the starting point of the vertical retrace period the multiplex unit 211 sets, for each piece of frame video information from amongst the received pieces of decoded video information, both a data enable signal DE for the video signal and a data enable signal ADE for the audio signal to LOW. The multiplex unit 211 outputs the data enable signals DE and ADE that have been set to LOW to the TDMS encoding unit 213.

Next, in the vertical retrace period, the multiplex unit 211 sets the audio signal data enable signal ADE to HIGH from a point at which the HDCP encryption unit 215 has completed calculating a frame key (explained later), and outputs the data enable signal ADE set to HIGH to the TMDS encoding unit 213. The multiplex unit 211 also starts outputting the encoded audio signal from the point at which the HDCP encryption unit 215 has completed calculating the frame key.

FIG. 5 shows how the data enable signals DE and ADE, the decoded video information, and the encoded audio information in one time slot in which one piece of frame video data information is transmitted vary over time. In this figure time elapses from left to right along a line 401, then from left to right along a line 402, and so on in the same manner along lines 403, 404, . . . , and 405.

The time slot shown by the lines 401, 402, . . . , 403 is the vertical retrace period.

In the time slot shown by the line 401, the multiplex unit 211 sets the data enable signal DE to LOW, and sets the data enable signal ADE to LOW. The multiplex unit 211 does not output decoded video information or encoded audio information in this time slot. Furthermore, at the starting point of the time slot shown by the line 401, calculation of the frame key by the HDCP encryption unit 215 begins.

Likewise, at the starting point of the time slot shown by the line 402 the multiplex unit 211 sets the data enable signals DE and ADE to LOW. Next, in the time slot shown by the line 402, supposing that the calculation of the frame key by the HDCP encryption unit 215 has been completed, the multiplex unit 211 sets the audio signal data enable signal ADE to HIGH from the point at which the calculation of the frame key is completed, and outputs the data enable signal ADE set to HIGH to the TMDS encoder 213. The multiplex unit 211 also starts outputting one piece of audio information from the point at which the calculation of the frame key has been completed.

In the time slot shown from the next line after the line 402 to the line 403, the multiplex unit 211 sets the data enable signal DE to LOW, sets the audio signal data enable signal ADE to HIGH, and outputs the data enable signals DE and ADE to the TMDS encoding unit 213. Furthermore, the multiplex unit 211 continues to output the piece of line video information.

Next, in the time slot shown by the line 404 the multiplex unit 211 sets the data enable signal DE to LOW for the time slot that corresponds to the horizontal retrace period, and outputs the data enable signal DE set to LOW to the TMDS encoding unit 213. Next, for the period for one piece of line video information that starts directly after the horizontal retrace period has ended, the multiplex unit 211 sets the data enable signal DE to HIGH, and outputs the data enable signal DE set to HIGH to the TMDS encoding unit 213.

Furthermore, in the time slot shown by the line 404 the multiplex unit 211 sets, in the horizontal retrace period, the audio signal data enable signal ADE to HIGH, outputs the data enable signal ADE set to HIGH, and continues to output the piece of line audio information to the encryption unit 212. Here, the piece of line audio information continuously output in the lines 402 to 404 is composed of a number of audio cells that is determined according to the point at which the HDCP encryption unit 215 completed calculating the frame key. Each audio cell is composed of encoded audio information that is 24 bits long. Furthermore, in the period starting directly after the horizontal retrace period ends, the multiplex unit 211 outputs a piece of line video information to the encryption unit 212. Here, apiece of line video information is composed of 720 pixels.

Figure 6:
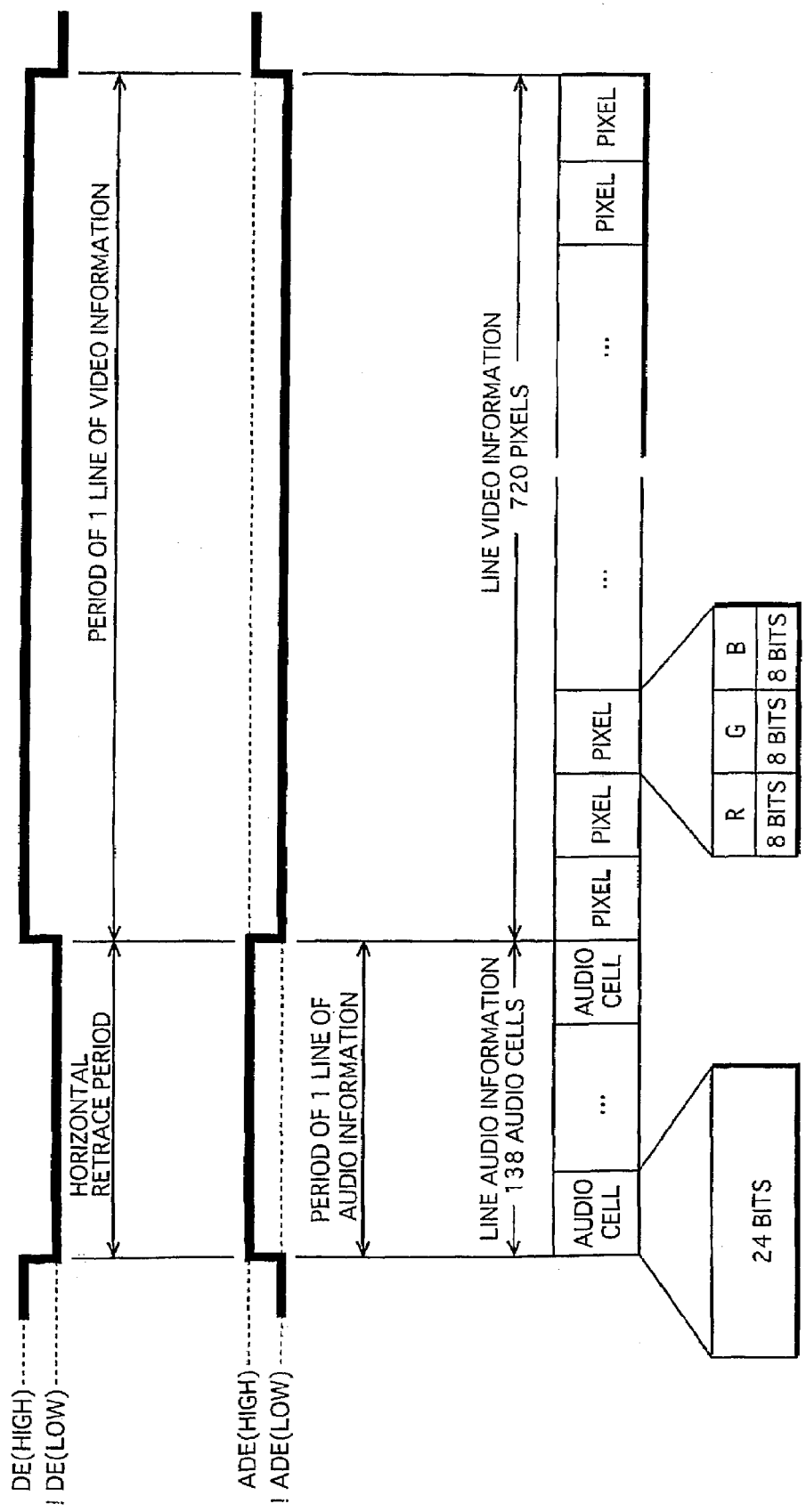
FIG. 6 shows changes in one line of data enable signals DE and ADE, decoded video information, and encoded audio information, as time elapses.

FIG. 6 shows the relationship in the time slots in the next line after the time slot shown by the line 404 to the time slot shown by the line 405 between the data enable signals DE and ADE, the encoded audio information, and the decoded video information. As shown in the figure, the multiplex unit 211 outputs a piece of line audio information to the encryption unit 212 in the horizontal retrace period. Here, the piece of line audio information is composed of 138 audio cells. Each audio cell is composed of a piece of encoded audio information that is 24 bits long. In addition, the multiplex unit 211 outputs one piece of line video information to the encryption unit 212 in the period that starts directly after the horizontal retrace period has ended. Here, the one piece of line video information is composed of 720 pixels.

In addition, the multiplex unit 211, in the vertical retrace period, generates a predetermined number of vertical synchronization signals VSYNC, and outputs the generated vertical synchronization signals VSYNC to the TMDS encoding unit 213. Furthermore, the multiplex unit 211, in the horizontal retrace period, generates a horizontal synchronization signal HSYNC, and outputs the generated horizontal synchronization signal HSYNC to the TMDS encoding unit 213.

(2) Authentication Key Exchange Unit 214

The authentication key exchange unit 214 operates following the HDCP specification. The main operation of the authentication key exchange unit 214 is to generate random numbers for device authentication, key exchange, and encryption between the authentication key exchange unit 214 and the device on the reception side. Details regarding the authentication key exchange unit 214 are specified by the HDCP specification and are thus omitted here.

The authentication key exchange unit 214 is connected via the cable 50b, which is an I²C bus, to an authentication key exchange unit 314 that is described later.

Note that functions and structure unique to the authentication key exchange unit 214 of the present embodiment are described later.

(3) Encryption Unit 212

Each clock cycle the encryption unit 212 receives a pixel and an audio cell from the multiplex unit 212, and receives a random number PRj from the authentication key exchange unit 214.

Next, on receiving a pixel, the encryption unit 212 performs exclusive OR on the received pixel and random number PRj one bit at a time to generate an encrypted pixel, and outputs the generated encrypted pixel to the TMDS encryption unit 213. This exclusive OR operation is shown by Expression 1.

encrypted pixel=pixel(+)random number PRj <Expression 1>

Here, the operator (+) shows exclusive OR.

Likewise, on receiving an audio cell, the encryption unit 212 performs exclusive OR on the received audio cell and random number PRj one bit at a time to generate an encrypted audio cell, and outputs the generated encrypted audio cell to the TMDS encoding unit 213. This exclusive OR operation is shown by Expression 2.

encrypted audio cell=audio cell(+)random number PRj <Expression 2>

(2) TDMS Encoding Unit 213

The TDMS encoding unit 213 is connected via the cable 50a to a TDMS decoding unit 311 that is described later.

Figure 7:
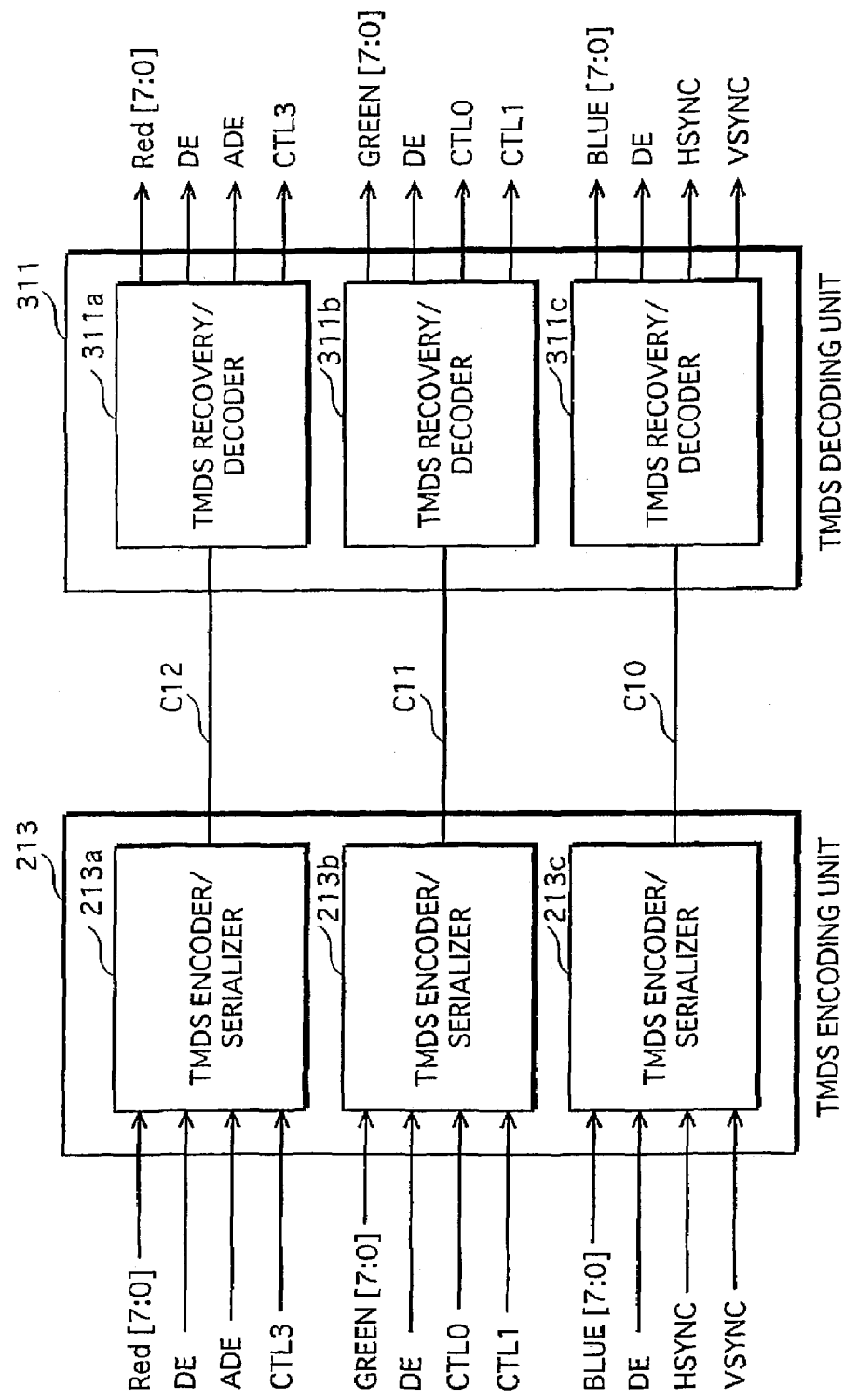
FIG. 7 is a block drawing showing the structure of a TMDS encoding unit 213 and a TDMS decoding unit 311.

As shown in FIG. 7, the TMDS encoding unit 213 is composed of TMDS encoder/serializers 213a, 213b, and 213c which are connected respectively via channels C12, C11, and C10 in the cable 50a, to TMDS recovery/decoders 311a, 311b, and 311c that are described later.

TMDA Encoder/Serializer 213a

The TMDS encoder/serializer 213a receives RED component information of an encrypted pixel, and the first 8 bits of an audio cell, from the encryption unit 212. In addition, the TMDS encoder/serializer 213a receives a data enable signal DE for video information, a data enable signal ADE for audio information, and other control signals, from the multiplex unit 211.

The TMDS encoder/serializer 213a TDMS encodes the received 8-bit RED component information, the first 8 bits [23:16] of the audio cell, the data enable signal DE, the data enable signal ADE, and the other control signals, serializes the result, and sends the serialized result via the channel C12 to the TMDS recovery/decoder 311a.

In more detail, the TMDS encoder serializer 213a converts the 8-bit RED component information and the first 8 bits [23:16] of the audio cell both to 10-bit information, serializes the pieces of 10-bit information, and sends the result. By converting from 8 bits to 10 bits, information that is more suitable for high-speed transmission with fewer data change points is obtained. The TMDS encoder/serializer 213a also coverts both the data enable signals DE and ADE, which are the 2-bit control signals, into 10 bits, and sends the converted signals.

TMDS Encoder/Serializer 213b

The TMDS encoder/serializer 213b receives the GREEN component information of the encrypted pixel, and the middle 8 bits [15:8] of the audio cell, from the encryption unit 212. The TMDS encoder/serializer 213b also receives the data enable signal DE for the video signal, and other control signals, from the multiplex unit 211.

The TMDS encoder/serializer 213b encodes, in the same manner described above, the received 8-bit GREEN component information, the middle 8 bits [15:8] of the audio cell, the data enable signal DE, and the other control signals, serializes the result, and sends the serialized result via the channel C11 to the TMDS recovery/decoder 311b.

TMDS Encoder/Serializer 213c

The TMDS encoder/serializer 213c receives the BLUE component information of the encrypted pixel, and the end 8 bits [0:7] of the audio cell, from the encryption unit 212. The TMDS encoder/serializer 213b also receives the data enable signal DE for the video signal, the vertical synchronization signal VSYNC, and the horizontal synchronization signal HSYNC, from the multiplex unit 211.

The TMDS encoder/serializer 213c encodes, in the same manner described above, the received 8-bit BLUE component information, the end 8 bits [0:7] of the audio cell, the data enable signal DE, the vertical synchronization signal VSYNC, and the horizontal synchronization signal HSYNC, serializes the result, and sends the serialized result via the channel C10 to the TMDS recovery/decoder 311c.

1.3 Video Connection Unit 301

(1) TMDS Decoding Unit 311

As shown in FIG. 7, the TMDS decoding unit 311 is composed of TMDS recovery/decoders 311a, 311b, and 311c.

TMDS Recovery/Decoder 311a

The TMDS recovery/decoder 311a receives the serial data from the TDMS encoding unit 213 via the channel C12, and decodes from the received serial data the 8-bit RED component information, the first 8 bits [23:16] of the audio cell, the data enable signal DE, the data enable signal ADE, and the other control signals. The TMDS recovery/decoder 311a outputs the 8-bit RED component information and the first 8 bits [23:16] of the audio cell to the encryption unit 312, and outputs the data enable signal DE, the data enable signal ADE, and the other control signals to the separation unit 313.

TMDS Recovery/Decoder 311b

The TMDS recovery/decoder 311b receives the serial data from the TDMS encoding unit 213 via the channel C12, and decodes from the received serial data the 8-bit GREEN component information and the middle 8 bits [15:8] of the audio cell, and outputs the decoded result to the encryption unit 312.

TMDS Recovery/Decoder 311c

The TMDS recovery/decoder 311c receives the serial data from the TDMS encoding unit 213 via the channel C10, and decodes from the received serial data the 8-bit BLUE component information, the end 8 bits [7:0] of the audio cell, the vertical synchronization signal VSYNC, and the horizontal synchronization signal HSYNC. The TMDS recovery/decoder 311c outputs the 8-bit BLUE component information and the end 8 bits [7:0] of the audio cell to the encryption unit 312, and outputs the vertical synchronization signal VSYNC, and the horizontal synchronization signal HSYNC to the display control unit 302.

(2) Authentication Key Exchange Unit 314

The authentication key exchange unit 314 operates following HDCP specifications, as does the authentication key exchange unit 214. The main operation of the authentication key exchange unit 314 is to generate random numbers for device authentication, key exchange, and encryption between the authentication key exchange unit 314 and the device on the transmission side. Details regarding the authentication key exchange unit 314 are specified by HDC specifications and are thus omitted here.

Note that functions and structure unique to the authentication key exchange unit 314 of the present embodiment are described later.

(3) Encryption Unit 312

The encryption unit 312 operates in the same way as the encryption unit 212.

Each clock cycle the encryption unit 312 receives an encrypted pixel and an encrypted audio cell from the TMDS decoding unit 311, and receives a random number PRj from the authentication key exchange unit 314.

Next, upon receiving a pixel, the encryption unit 312 performs exclusive OR on the received encrypted pixel and random number PRj one bit at a time to generate a decrypted pixel, and outputs the generated decrypted pixel to the separation unit 313. This exclusive OR operation is shown by Expression 3.

decrypted pixel=encrypted pixel(+)random number PRj                                                <Expression 3>

Here, the random number used to generate the encrypted pixel in Expression 1 and the random number used to generate the decrypted pixel in Expression 3 have the same value, therefore the original pixel is obtained as a result of the decryption.

Likewise, on receiving an encrypted audio cell, the encryption unit 312 performs exclusive OR on the received encrypted audio cell and random number PRj one bit at a time to generate an decrypted audio cell, and outputs the generated decrypted audio cell to the separation unit 313. This exclusive OR operation is shown by Expression 4.

decrypted audio cell=encrypted audio cell(+)random number PRj                                              <Expression 4>

Here, the random number used to generate the encrypted audio cell in Expression 2 and the random number used to generate the decrypted audio cell in Expression 4 have the same value, therefore the original audio cell is obtained as a result of the decryption.

(4) Separation Unit 313

Each clock cycle, the separation unit 313 receives 24-bit length information from the encryption unit 312, and a data enable signal DE and a data enable signal ADE from the TMDS decoding unit 311.

When the received data enable signal DE is HIGH, the separation unit 313 considers the received 24-bit data to be a decrypted pixel, and each clock cycle outputs the received 24-bit information to the display control unit 302. The separation unit 313 also outputs the data enable signal DE to the display control unit 302.

When the received data enable signal ADE is HIGH, the separation unit 313 considers the received 24 bit data to be a decrypted audio cell, and each clock cycle outputs the received 24-bit information to the speaker control unit 304. The separation unit 313 also outputs the data enable signal ADE to the speaker control unit 304.

1.4 Display Control Unit 302 and CRT Unit 303

The display control unit 302 receives a decrypted pixel and a data enable signal DE from the separation unit 313 each clock cycle, and receives a vertical synchronization signal VSYNC and a horizontal synchronization signal HSYNC from the TMDS decryption unit 311.

The display control unit 302 generates RED, GREEN, and BLUE analog signals based on the decrypted pixel, the data enable signal DE, the vertical synchronization signal VSYNC and the horizontal synchronization signal HSYNC received every clock cycle, and outputs each generated analog signal to the CRT unit 303.

The CRT unit 303 receives the RED, GREEN, and BLUE analog signals from the display control unit 302, and displays a color image.

1.5 Speaker Control Unit 304 and Speakers 305

The speaker unit 304 receives a decrypted audio cell and a data enable signal ADE from the separation unit 313 each clock cycle. While the received data enable signals ADE are HIGH, the speaker unit 304 decodes the received decrypted audio cell to generate audio information, converts the generated audio information to generate an analog signal, and outputs the generated analog signal to the speakers 305.

The speakers 305 receive the analog signal from the speaker control unit 304, covert the received analog signal to generate audio, and output the generated audio.

2. Operations of the Personal Computer System 10

The following describes the operations of the personal computer system 10.

(1) Overview of Operations of Personal Computer System 10

Figure 8:
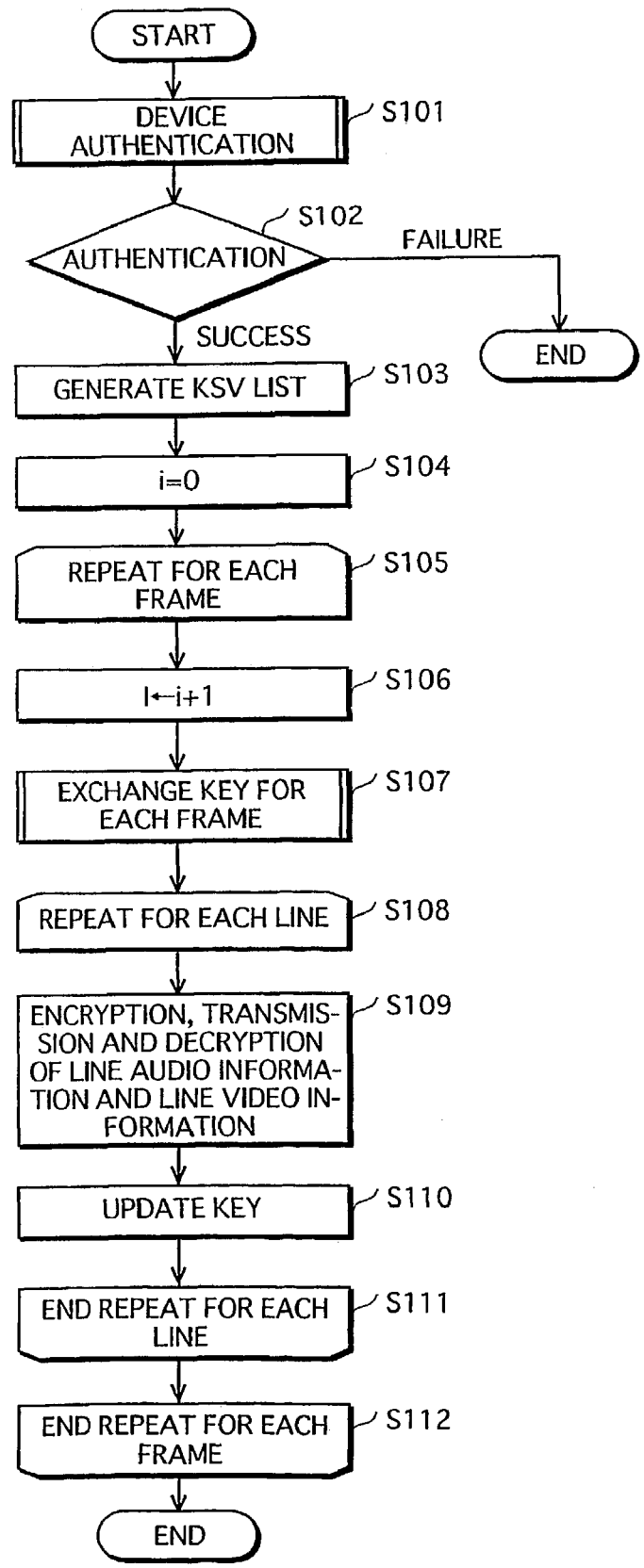
FIG. 8 is a flowchart showing an overview of the operation of the personal computer system 10 when reproducing encoded video/audio information.

An overview of the operations of the personal computer system 10 when reproduction of audio/video information recorded on a DVD is instructed by the user is given with reference to the flowchart in FIG. 8.

Authentication is performed between the computer 20 and the CRT display 30 based on the HDCP specification. Here, the computer 20 verifies whether the CRT display device 30 is legitimate (step S101), and when the authentication fails (step S102) the process ends.

When the authentication succeeds (step S102), the computer 20 generates a KSV list based on the HDCP specification (step S103). Note that the HDCP specification describes KSV list generation, thus a description is omitted here.

Next, the computer 20 sets a value of a variable i showing a frame number to "0" (step S104).

Then, the processing shown in steps S105 to S111 is repeated at steps S105 to S112 for each frame.

The computer 20 adds 1 to the value of the variable i (step S106), and performs key exchange each frame (step S107). Next, at steps S108 to S111, steps S109 to S110 are repeated for each line.

Encryption, transmission, and decryption of one piece of line audio information and one piece of line video information are performed (step S109), and the key is updated based on HDCP specifications (step S110).

(2) Device Authentication Operations

Figure 9:
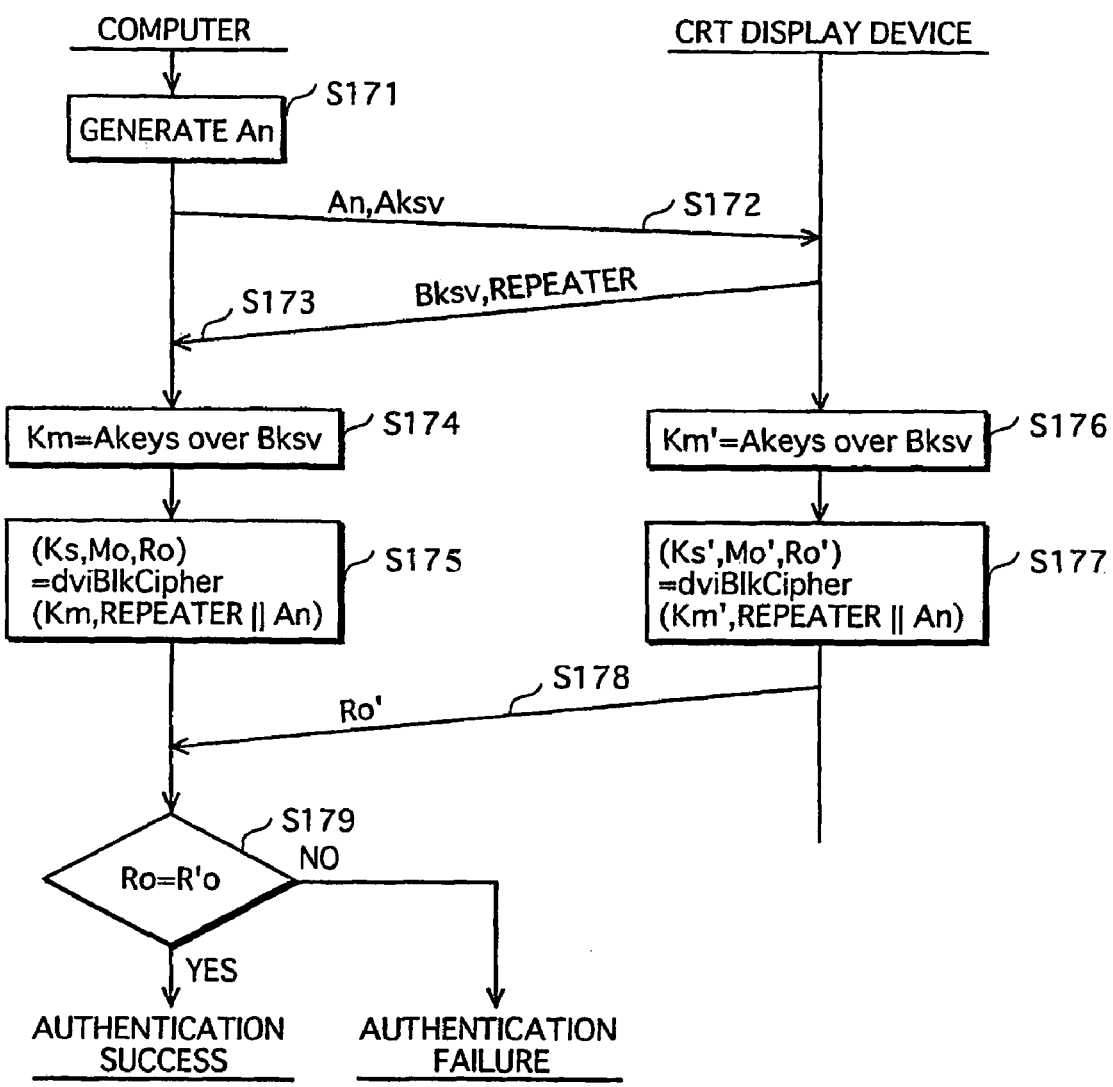
FIG. 9 is a flowchart showing device authentication operations.

The device authentication operations shown by step S101 in FIG. 8 are described using the flowchart shown in FIG. 9. Note that device authentication is described in the HDCP specification, thus a detailed description is omitted.

The authentication key exchanging unit 214 generates an An (step S171), and transmits the An and the Aksv via the cable 50b, which is an I$^2$C bus, to the authentication key exchange unit 314 (step S172).

The authentication key exchange unit 314 transmits the Bksv and the REPEATER via the cable 50b to the authentication key exchange unit 214 (step S173).

The authentication key exchange unit 214 calculates Km=Akeys over Bksv (step S174), and calculates (Ks, M$_0$, R$_0$)=dviBlkCipher (Km, REPEATER∥An) (step S175).

The authentication key exchange unit 314 calculates Km'=Bkeys over Aksv (step S176), calculates (Ks', M$_0$', R$_0$')=dviBlkCipher (Km', REPEATER∥An) (step S177), and transmits R$_0$' via the cable 50b to the authentication key exchange unit 214 (step S178).

The authentication key exchange unit 214 compares R$_0$ and R$_0$', and when the two are identical (step S179), recognizes the CRT display device 30 as being a legitimate device. When R$_0$ and R$_0$' are not identical (step S179), the authentication key exchange unit 214 recognizes the CRT display device 30 as not being a legitimate device.

(3) Key Sharing Operations for Each Frame

Figure 10:
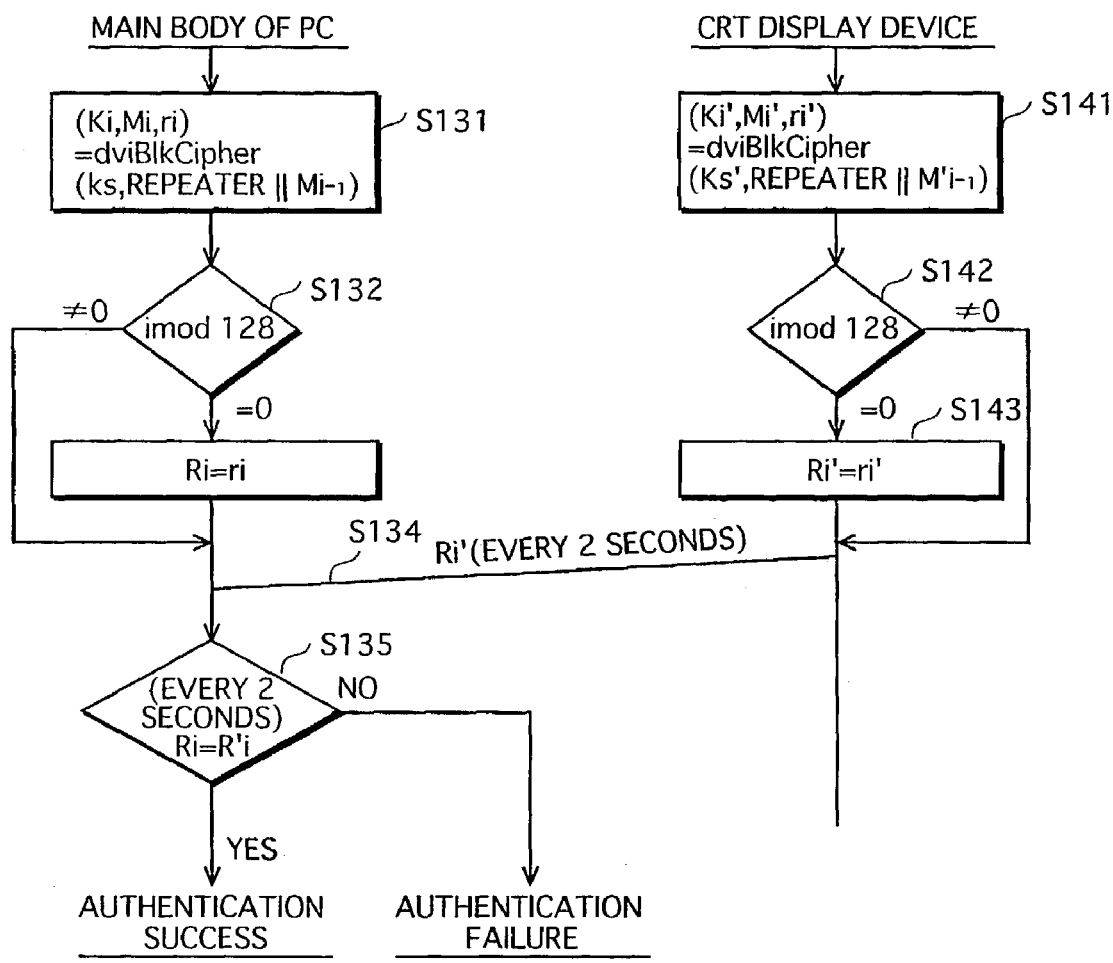
FIG. 10 is a flowchart showing key exchange operations for each frame.

The following describes the operations shown by step S107 in FIG. 8, with use of the flowchart shown in FIG. 10. Note that key exchange for each frame is described in the HDCP specification, thus a detailed description is omitted.

The authentication key exchange unit 214 calculates (Ki, Mi, Ri,)=dviBlkCipher (Ks, REPEATER∥Mi−1) (step S131). Next, the authentication key exchange unit 214, only when (i mod 128) is "0" (step S132), calculates Ri=ri (step S133).

The authentication key exchange unit 314 calculates (Ki', Mi', Ri')=dviBlkCipher (Ks', REPEATER∥M'i−1) (step S141). Next, the authentication key exchange unit 314 only when (i mod 128) is "0" (step S142), calculates Ri'=ri' (step S143). Next, the authentication key exchange unit 314 transmits Ri' every two seconds via the cable 50b to the authentication key exchange unit 214.

The authentication key exchange unit 214 compares Ri and Ri' every two seconds, and when Ri and Ri' are identical (step S135) recognizes the CRT display device 30 as being a legitimate device. When Ri and Ri' are not identical, the authentication key exchange unit 214 recognizes the CRT display device 30 as not being a legitimate device.

Figure 11:
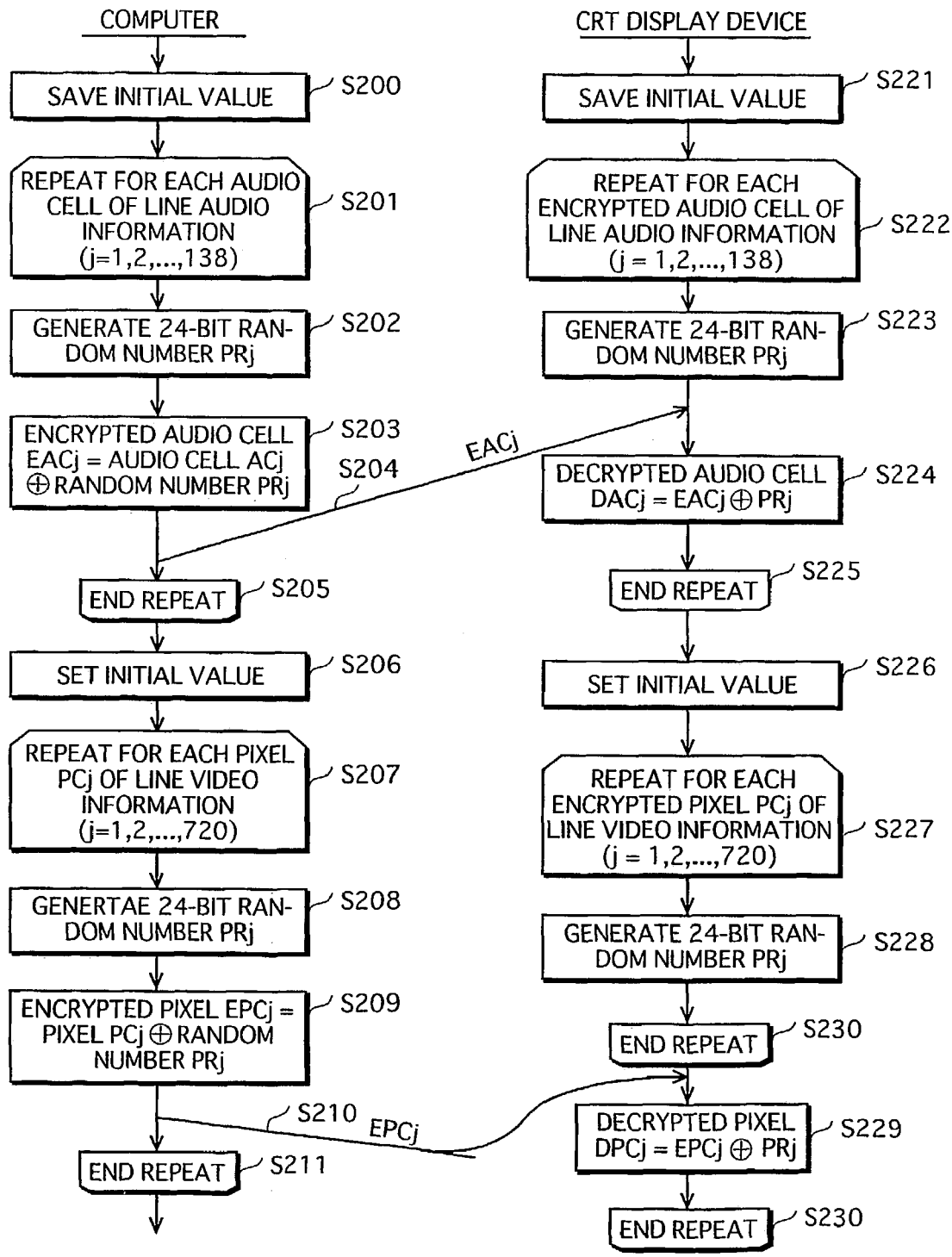
FIG. 11 is a flowchart showing audio information and video information encryption, transmission and decryption, in one line.

(4) Encryption, Transmission, and Decryption Operations for One Piece of Line Audio Information and One Piece of Line Video Information The following describes encryption, transmission, and decryption operations shown by step S109 in FIG. 8 for one piece of line audio information and one piece of line video information, with use of the flowchart in FIG. 11.

The authentication key exchange unit 214 temporarily saves, as a saved initial value, an initial value used in random numbers generation specified by the HDCP specification. Here, the initial value is specifically Mi−1 (step S200).

Next, at steps S201 to S205, the following steps S202 to S204 are repeated for each audio cell Acj in one piece of line audio information. Here, there are 138 audio cells in one piece of line audio information. The variable j takes a value of 1 through to 138 in the aforementioned repetition of the steps S202 to S204.

The authentication key exchange unit 214 generates a 24-bit random number PRj (step S202), and the encryption unit 212 performs exclusive OR on the audio cell Acj and the random number PRj to generate an encrypted audio cell EACj (step S203). Next, the encryption unit 212 transmits the generated encrypted audio cell EACj to the encryption unit 312, via the TMDS encoding unit 213, the cable 50a, and the TMDS decoding unit 311 (step S204).

The authentication key exchange unit 314 temporarily saves, as a saved initial value, an initial value used in random number generation specified by the HDCP specification. Here, the initial value is specifically M'i−1 (step S221).

Next, at steps S222 to S225, the following steps S223, S204, and S224 are repeated for each encrypted audio cell DACj in one piece of line audio information. Here, there are 138 encrypted audio cells in one piece of line audio information. The variable j takes a value of 1 through to 138 in the aforementioned repetition of the steps S223, S204, and S224.

The authentication key exchange unit 314 generates a 24-bit random number PRj (step S223), and the encryption unit 312 performs exclusive OR on the encrypted audio cell DACj and the random number PRj to generate an decrypted audio cell DACj. Then the encryption unit 312 outputs the generated decrypted audio cell DACj to the separation unit 313 (step S224).

The authentication key exchange unit 214 restores the initial value from the temporarily stored saved initial value (step S206). Next, at steps S207 to S211 the following steps S208 to S211 are repeated for each pixel PCj in one piece of line video information. Here, there are 720 pixels in one piece of line video information. The variable j takes a value of 1 through to 720 in the aforementioned repetition of the steps S208 to S210.

The authentication key exchange unit 214 generates a 24-bit random number PRj (step S208), and the encryption unit 212 performs exclusive OR on the pixel PCj and the random number PRj to generate an encrypted pixel EPCj (step S209). Next, the encryption unit 212 transmits the generated encrypted pixel EPCj to the encryption unit 312, via the TMDS encoding unit 213, the cable 50a, and the TMDS decoding unit 311 (step S210).

The authentication key exchange unit 314 restores the initial value from the temporarily stored saved initial value (step S226). Next, at steps S227 to S230 the following steps S228, S210, and S229 are repeated for each encrypted pixel DPCj in one piece of line video information. Here, there are 720 pixels in one piece of line video information. The variable j takes a value of 1 through to 720 in the aforementioned repetition of the steps S228, S210, and S229.

The authentication key exchange unit 314 generates a 24-bit random number PRj (step S228), and the encryption unit 312 performs exclusive OR on the encrypted pixel EPCj and the random number PRj to generate an decrypted pixel DPCj. Then the encryption unit 312 outputs the generated decrypted pixel DPCj to the separation unit 313 (step S229).

(5) Encryption [Decryption] by the HDCP Encryption Unit 215 [HDCP Decryption Unit 315]

Figure 12:
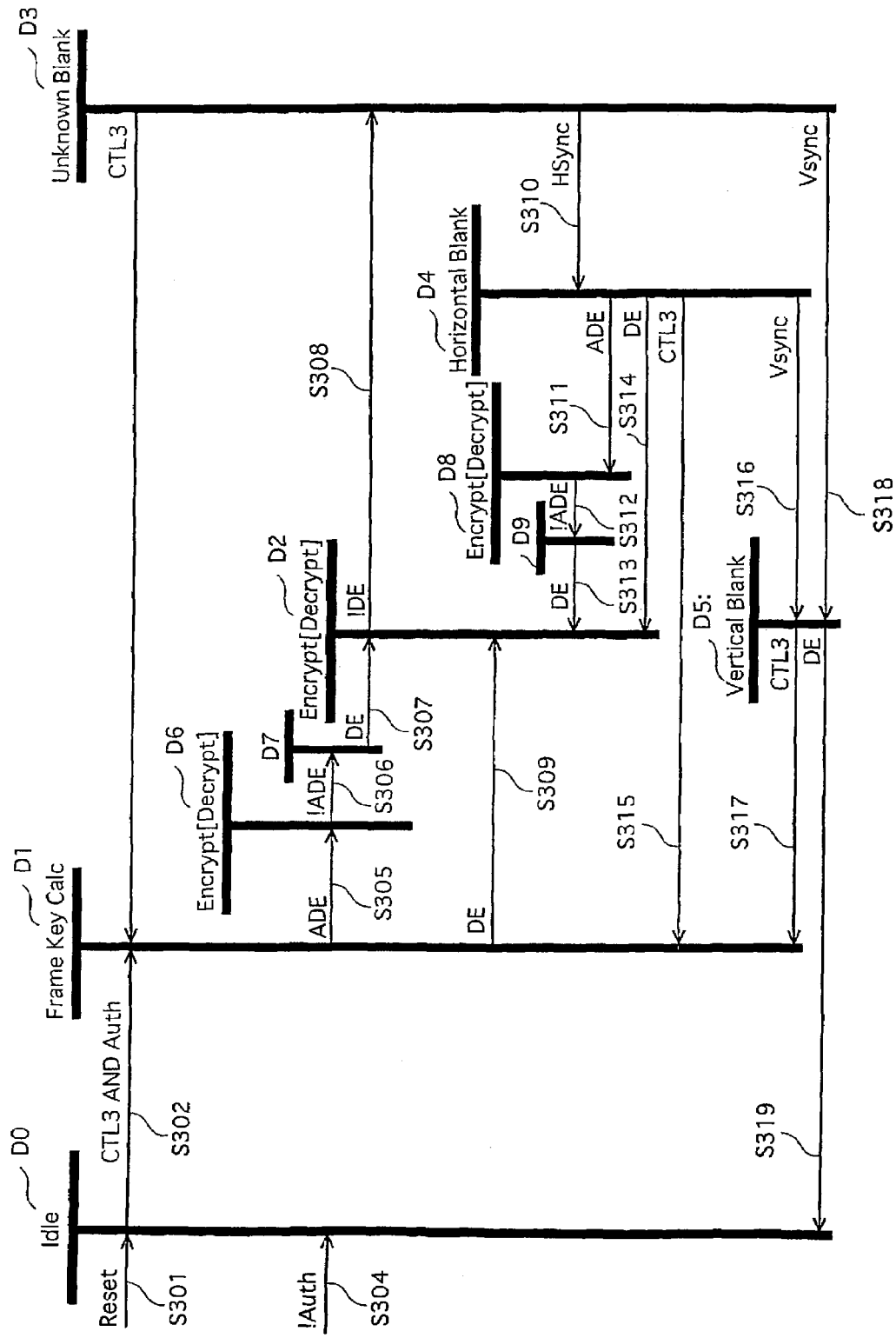
FIG. 12 is a transition chart showing state transition in encrypting [decrypting] by an HDCP encryption unit 215 [HDCP decryption unit 315].

The following describes state transition in encryption [decryption] by the HDCP encryption unit 215 [HDCP decryption unit 315], with use of FIG. 12. Note that the contents of square brackets denote state transition in decryption by the HDCP decryption unit 315.

<Transition from any State to Idle State D0>

In the case of reset conditions (step S301), or authentication failure (step S304) the HDCP encryption unit 215 [HDCP decryption unit 315] transitions to an idle state D0.

<Transition from Idle State do to Frame Key Calculation State D1>

The HDCP encryption unit 215 [HDCP encryption unit 315], based on HDCP specifications, uses the CTL 3 signal, which is unused in the DVI specification, as a synchronization signal for frame key calculation. When authentication is successful and a DVI interface CTL 3 signal has been generated (step S302), the HDCP encryption unit 215 [HDCP encryption unit 315] transitions to a frame key calculation state D1 for performing frame key calculation. In the frame key calculation state D1, the HDCP encryption unit 215 [HDCP decryption unit 315] calculates a frame key to be used in encrypting [decrypting] the next video frame.

<Transition from Frame Key Calculation State D1 to Video Encryption [Decryption] State D2>

During the vertical blank period, when there is no audio signal start signal, on receiving a DE signal that gives the top of a video signal to be encrypted [decrypted] (step S309), the HDCP encryption unit 215 [HDCP decryption unit 315] transitions to a video encryption [decryption] state D2. In the video encryption state D2, the HDCP encryption unit 215 [HDCP decryption unit 315] encrypts [decrypts] the video signal.

<Transition from Video Encryption [Decryption] State D2 to Unknown Blank State D3>

The end of video data (generally the end of a line or the end of a frame) is notified by DE. This signal is shown as "!DE" in FIG. 12. On receiving !DE, the HDCP encryption unit 215 [HDCP decryption unit 315] transitions to an unknown blank state D3. In the unknown blank state D3, the HDCP encryption unit 215 [HDCP decryption unit 315] begins updating the key.

<Transition from Unknown Blank State D3 to Frame Key Calculation State D1>

On receiving a CTL 3 signal in the unknown blank state D3 (step S303), the HDCP encryption unit 215 [HDCP decryption unit 315] transitions to the frame key calculation state D1 to calculate a key for the next video frame.

<Transition from Unknown Blank State D3 to Horizontal Blank State D4>

The assertion of the HSync identifies the horizontal blank (generally between lines). On receiving the HSync (step S310), the HDCP encryption unit 215 [HDCP decryption unit 315] transitions to an horizontal blank state D4.

In the horizontal blank state D4, the HDCP encryption unit 215 [HDCP decryption unit 315] waits if updating of the key has not been completed in the unknown blank state D3.

<Transition from the Unknown Blank State D3 to the Vertical Blank State D5>

The assertion of the VSync identifies the vertical blank (generally between frames). On receiving the VSync, the HDCP encryption unit 215 [HDCP decryption unit 315] transitions to a vertical blank state D5.

<Transition from Horizontal Blank State D4 to Video Encryption [Decryption] State D2>

On receiving a DE signal when there is no audio signal in the horizontal blanking period (step S314), the HDCP encryption unit 215 [HDCP decryption unit 315] begins encryption [decryption] of the next line of video signal, and transitions the video encryption [decryption] state D2.

<Transition from Horizontal Blank State D4 to Frame Key Calculation State D1>

If a CTL signal 3 is generated (Step S315), the HDCP encryption unit 215 [HDCP decryption unit 315] transitions to the frame key calculation state D1 to calculate a key for the next frame.

<Transition from Horizontal Blank State D4 to Vertical Blank State D5>

The assertion of the VSync identifies the vertical blank. On receiving the VSync (Step S316), the HDCP encryption unit 215 [HDCP decryption unit 315] transitions to the vertical blank state D5.

In the vertical blank state D5, the HDCP encryption unit 215 [HDCP decryption unit 315] waits for an exit condition.

<Transition from Vertical Blank State D5 to Frame Key Calculation State D1>

If a CTL signal 3 is generated (Step S317), the HDCP encryption unit 215 [HDCP decryption unit 315] transitions to the frame key calculation state D1 to calculate a key for the next frame.

<Transition from Vertical Blank State D5 to Idle State D0>

If there is a return according to a DE signal to a video signal in the vertical blank period before the CLT 3 signal is generated (step S319), the HDCP encryption unit 215 [HDCP decryption unit 315] does not encrypt the next frame. This may happen in link authentication failure.

<Transition from Frame Key Calculation State D1 to Audio Encryption [Decryption] State D6>

If there is a start signal ADE for an audio signal during the video blanking period (Step S305), the HDCP encryption unit 215 [HDCP decryption unit 315] begins encryption [decryption] of the audio signal.

In the audio signal encryption [decryption] state D6, the HDCP encryption unit 215 [HDCP decryption unit 315] encrypts [decrypts] the audio signal.

<Transition from Audio Encryption [Decryption] State D6 to Video Signal Wait State D7>

On being notified of the end of the audio signal according to the ADE (step S306), the HDCP encryption unit 215 [HDCP decryption unit 315] transitions to a video signal wait state D7 where it waits for a video signal to start. In FIG. 12 this signal is expressed by "!ADE".

<Transition from Video Signal Wait State D7 to Video Encryption [Decryption] State D2>

The DE signal of the TDMS link gives the head of the video signal to be encrypted [decrypted]. On receiving the DE signal (step S307), the HDCP encryption unit 215 [HDCP decryption unit 315] transitions to the video encryption [decryption] state D2.

<Transition from Horizontal Blank State to Audio Encryption [Decryption] State D8>

On receiving the ADE signal (step S311), the HDCP encryption unit 215 [HDCP decryption unit 315] transitions to an audio encryption [decryption] state D8 to begin encrypting [decrypting] the audio signal of the next horizontal blanking period.

In the audio encryption [decryption] state D8, the HDCP encryption unit 215 [HDCP decryption unit 315] encrypts [decrypts] the audio signal.

<Transition from Audio Encryption [Decryption] State D8 to Video Signal Wait State D9>

On being notified according to an ADE that the audio signal has ended (step S312), the HDCP encryption unit 215 [HDCP decryption unit 315] transitions to a video signal wait state D9.

In the video signal wait state D9, the HDCP encryption unit 215 [HDCP decryption unit 315] waits for a video signal to start.

<Transition from Video Signal Wait State D9 to Video Signal Encryption [Decryption] State D2>

The DE signal of the TMDS link gives the head of a video signal to be encrypted [decrypted]. On receiving the DE signal (step S313), the HDCP encryption unit 215 [HDCP decryption unit 315] transitions to the video encryption [decryption] state D2.

3. Conclusion

According to the above-described embodiment, in the encryption transmission system that performs encryption transmission by time division multiplexing of a video signal and an audio signal, the transmission side performs time-based compression of the audio signal, and performs encryption transmission by multiplexing the compressed audio signal in a video signal blanking period.

Furthermore, the transmission side of the encryption transmission system, after authentication with the reception side and after a vertical synchronization signal, calculates a key for the frame, and encrypts the time-compressed audio signal using the calculated key. Then, the transmission side encrypts the video signal, further updates the key, encrypts the next time-compressed audio signal using the updated key after a horizontal synchronization signal, and then encrypts the next video signal.

Furthermore, after authentication with the transmission side and after a vertical synchronization signal, the reception side of the encryption transmission system calculates the frame key, and decrypts the encrypted audio signal using the calculated frame key. Then, the reception side decrypts the encrypted video signal, further updates the key, decrypts the next encrypted audio signal using the key that was updated after the horizontal synchronization signal, and then decrypts the next encrypted video signal.

Furthermore, the transmission side notifies the reception side of encrypted transmission of an audio signal with an audio signal enable signal, and notifies the reception side of encrypted transmission of a video signal with a video signal enable signal. Meanwhile, when there is an audio signal enable signal the reception side decrypts the audio signal, and when there is a video signal enable signal the reception side decrypts the video signal.

In this way, in the encryption transmission system, there is a data enable signal (ADE signal) for audio signals, in addition to the data enable signal (DA signal) for video signals in the conventional example. These signals are controlled as a multiplex control signal. Since this ADE signal is added, the reception side is able to perform processing corresponding to the transmission side even if the audio signal is not multiplexed.

Furthermore, the encryption transmission system uses the same encryption method in encryption of the video signal and encryption of the audio signal in both the transmission side and the reception side.

Furthermore, when the encryption method has an internal state, the encryption transmission system sets an initial state to encrypt the audio signal, and then resets the encryption method internal state to its original initial value, and encrypts the next video signal.

The HDCP Cipher used in HDCP holds the internal state, and is an encryption method that depends on this internal state to input data, while updating the internal state. The transmission side saves the internal state of the encryption method at the state D3, and after audio signal processing (state D8), at state D9 returns the internal state to the saved state to perform encryption processing (state D2) of the next video signal. Therefore, even if the reception side device is an HDCP-compatible device that can only process video signals, the internal state of the encryption method is the same in both the transmission side and the reception side when the video signal is decrypted (in other words, the transition from state D9 to state D2, and the transition from state D4 to state D2), thus the reception device can process the video signal correctly.

Furthermore, a common calculation module is used in authentication and key calculation in both the transmission side and the reception side, and in encryption of the video signal and the audio signal.

In this way, the encryption transmission system uses a common encryption algorithm for an audio signal and a video signal, therefore only minimum additions are required to a conventional encryption transmission system. In addition, a common calculation module is used in the same way as in HDCP in authentication and key sharing, and in encryption, therefore the scale of the system can be reduced.

Furthermore, the encryption transmission system multiplexes the video signal and the audio signal in the transmission side using a multiplex control signal, and separates these in the reception side using a multiplex control signal sent from the transmission side.

Furthermore, according to the present embodiment, the multiplex control signal is sent from the transmission side to the reception side, but it is possible to provide a non-signal period of a predetermined length between processing of an audio signal and processing of a video signal, and have the reception side switch between audio signal and video signal by recognizing the non-signal period. In this way, in the encryption transmission system, instead of the multiplex control signal being sent by the transmission side to the reception side, the non-signal period is provided between the switch between the audio signal and the video signal, and the reception side generates a multiplex control signal when it recognizes this non-signal period.

As has been explained, according to the present embodiment, by expanding the state transition of the HDCP specification and the scale of the system as little as possible, not only can conventional video signals be encryption transmitted, but also audio signals that have been time-compressed in a blanking period can be multiplexed and encryption transmitted. An audio signal switching unit is added to the HDCP specification, and control is performed by an audio signal enable signal and a switch signal. This control means that the same processing as conventional HDCP specifications is possible when an audio signal is not multiplexed. Note that when the addition of a switch signal is difficult, switching can be performed by providing a non-signal period of a specified length in the data signal and having this non-signal period detected by the reception unit.

Furthermore, encryption transmission of an audio signal with a video signal is possible while maintaining upward compatibility with the conventional HDCP specification and keeping expansion of the specification and the scale of the system to a minimum. Moreover, decryption and reproduction of an encrypted video signal are possible in a reception device that conforms to conventional HDCP specifications.

Furthermore, by using the same encryption method in encryption of an audio signal as in encryption of a video signal a compact scale with a minimum of extra modules is possible. In addition, by returning the internal state of the encryption method back to its initial value for each line after encryption of the audio signal of each line, video signals can be correctly decrypted even by a conventional HDCP specification-compatible reception device that does not comply to extended specifications, in other words that can only decrypt video signals.

4. Other Embodiments

The present invention is described based on, but is not limited to, the above-described embodiment. Cases such as the following are included in the present invention.

(1) The present invention is not limited to being implemented by a personal computer. The present invention may be implemented in reproducing digital video to which digital audio is attached in a DVD (Digital Versatile Disk) reproduction device, a digital broadcast reception device, and the like.

(2) Although according to the present embodiment encoded audio information is transmitted to the video connection unit 301 from the video connection unit 201 via all of the channels C12, C11, and C10, it is possible to reduce the amount of encoded audio information that is transmitted, and transmit the encoded audio information via one or two of the channels.

Furthermore, transmission of encoded audio information from the video connection unit 201 to the video connection unit 301 is not limited to taking place in the vertical retrace period and horizontal retrace period, but may take place only in the vertical retrace period, or only in the horizontal retrace period.

(3) The present invention may be a method of any of the above-described embodiments. Furthermore, the present invention may be a computer program that implements any of the methods.

Furthermore, the present invention may be the aforementioned computer program aforementioned digital signal recorded on a computer-readable recording medium such as a flexible disk, a hard disk, a CD-ROM (compact disk read only memory), an MO (magneto-optical), a DVD, a DVD-ROM (digital versatile disk read only memory), a DVD-RAM (digital versatile disk random access memory), a semiconductor memory, and the like. Furthermore, the present invention may be the aforementioned computer program recorded on any of the aforementioned recording mediums.

Furthermore, the present invention may be the aforementioned computer program transmitted via an electric communication line, a wireless or wired communication line, a network of which the Internet is representative, and the like.

Furthermore, the present invention may be a computer system that has a microprocessor and a memory, the memory storing the aforementioned computer program, and the microprocessor operating following the aforementioned computer program.

Furthermore, by recording and transferring the aforementioned program or the aforementioned digital signal on the aforementioned recording medium, or by transferring the aforementioned program via the aforementioned network, the aforementioned program may be implemented by another independent computer system.

(4) The present invention may be any combination of the above-described embodiment and the above-described variations.

INDUSTRIAL APPLICABILITY

The present invention can be used in outputting video and audio in a personal computer, an information processing terminal, and the like. Furthermore, the present invention can also be used in outputting video and audio in a DVD reproduction device, a digital broadcast reception device, and the like.

The invention claimed is:

1. A transmission system comprising:
a video transmission device operable to encrypt and transmit frame information that includes digital video information while providing one or more blanking intervals during the frame information; and
a video display device operable to receive and decrypt the encrypted frame information, extract the digital video information from the decrypted frame information, and display the extracted video information, wherein
the video transmission device is operable to multiplex digital audio information with the frame information in the one or more blanking intervals, encrypt the multiplexed frame information with which the digital audio information has been multiplexed, and transmit the encrypted frame information,
the video display device is operable to receive the encrypted frame information, decrypt the received encrypted frame information to generate frame information, extract the digital audio information from the one or more blanking intervals provided in the generated frame information, and convert the extracted digital audio information to an audio signal,
the digital video information includes a plurality of pieces of line video information that correspond respectively to lines in a frame, and the digital audio information includes a plurality of pieces of line audio information that correspond respectively to the lines in the frame, the video transmission device, for each line in the frame, is operable to set an initial value for audio, encrypt a corresponding piece of line audio information using the set initial value for audio with an encryption method, then set an initial value for video to have a same value as the initial value for audio, and encrypt a corresponding piece of line video information using the set initial value for video with the encryption method, and the video display device, for each line in the frame is operable to set an initial value for audio, decrypt a corresponding piece of line audio information using the set initial value for audio with a decryption method, then set an initial value for video to have a same value as the initial value for audio, and decrypt a corresponding piece of line video information using the set initial value for video with the decryption method.

2. A video transmission device for transmitting and encrypting frame information that includes digital video information, while providing one or more blanking intervals during the digital video information, the video transmission device comprising:

multiplex means for multiplexing digital audio information with the frame information during the one or more blanking intervals;

encryption means for encrypting the frame information with which the digital audio information has been multiplexed; and transmission means for transmitting the encrypted frame information, wherein the digital video information includes a plurality of pieces of line video information that correspond respectively to lines in a frame, and the digital audio information includes a plurality of pieces of line audio information that correspond respectively to the lines in the frame, the encryption means, for each line in the frame, is operable to set an initial value for audio, encrypt a corresponding piece of line audio information using the set initial value for audio, with an encryption method, then set an initial value for video to have a same value as the initial value for audio, and encrypt a corresponding piece of line video information using the set initial value for video with the encryption method.

3. The video transmission device of claim 2, wherein the frame information includes, after a vertical blanking interval, a predetermined number of pieces of line video information after each of which a horizontal blanking interval is provided, and the multiplex means is operable to multiplex the pieces of line audio information during the vertical blanking interval and/or the horizontal blanking intervals.

4. The video transmission device of claim 3,
wherein the encryption means includes:

a frame key generation unit for generating a frame key that corresponds to the frame information, to be used as an encryption key; and a frame encryption unit for encrypting, using the frame key generated corresponding to the frame information, the digital audio information and the digital video information included in the frame information.

5. The video transmission device of claim 4,
wherein the frame encryption unit includes:

a line encryption sub-unit for encrypting, using the frame key, one of the pieces of line audio information and one of the pieces of line video information included in the frame information;

a key updating sub-unit for updating the frame key; and a repeat control sub-unit for controlling, until encryption of all of the pieces of line audio information and all of the pieces of line video information has finished, the line encryption sub-unit to encrypt a next piece of line audio information and a next piece of line video information using the updated frame key, and controlling the key updating sub-unit to update the updated frame key again.

6. The video transmission device of claim 4, wherein the transmission means is operable to transmit the encrypted frame information to a video display device, and the encryption means is operable to authenticate the video display device with a common calculation module, in generating the frame key, and in encrypting the frame information.

7. The video transmission device of claim 3, wherein the multiplex means is operable to generate (a) a video enable signal that indicates transmission of the digital video information, in a period in which the digital video information is included in the frame information, and (b) an audio enable signal that indicates transmission of the digital audio information, in the one or more blanking intervals, and the transmission means is further operable to transmit the generated video enable signal and the generated audio enable signal.

8. The video transmission device of claims 7,
wherein the multiplex means is operable to generate the audio enable signal in the vertical blanking interval and/or the horizontal blanking intervals during which the digital audio information is multiplexed.

9. The video transmission device of claim 2, wherein the multiplex means is operable to generate the frame information using a multiplex control signal that identifies transmission of the digital audio information and the digital video information, and the transmission means is operable to transmit the multiplex control signal.

10. The video transmission device of claim 2,
wherein the multiplex means is operable to generate the frame information while providing a non-signal period between the digital audio information and the digital video information.

11. A video display device for receiving the encrypted frame information from the video transmission device of claim 2, decrypting the received frame information, extracting the digital video information from the decrypted frame information, and displaying the extracted digital video information, the video display device comprising:

reception means for receiving the encrypted frame information;

decryption means for decrypting the encrypted frame information;

extraction means for extracting the decrypted digital audio information from the one or more blanking intervals provided during the frame information, and extracting the digital video information from a period other than the one or more blanking intervals; and output means for displaying the extracted digital video information, and converting the extracted digital audio information to audio, wherein the digital video information includes a plurality of pieces of line video information that correspond respectively to lines in a frame, and the digital audio information includes a plurality of pieces of line audio information that correspond respectively to the lines in the frame, the decryption means, for each line in the frame, is operable to set an initial value for audio, decrypt a corresponding piece of line audio information using the set initial value for audio with a decryption method, then set an initial value for video to have a same value as the initial value for audio, and decrypt a corresponding piece of line video information using the set initial value for video with the decryption method.

12. The video display device of claim 11, wherein the frame information includes, after a vertical blanking interval, a predetermined number of pieces of line video information after each of which a horizontal blanking interval is provided, the plurality of pieces of line audio information are multiplexed in the vertical blanking interval and/or the horizontal blanking intervals, and the extraction means is operable to extract the pieces of line audio information from the vertical blanking interval and/or the horizontal blanking intervals.

13. The video display device of claim 12, wherein the decryption means includes:

a frame key generation unit for generating a frame key that corresponds to the frame information, to be used as an decryption key; and a frame decryption unit for decrypting, using the frame key generated corresponding to the frame information, the digital audio information and the digital video information included in the frame information.

14. The video display device of claim 13, wherein the frame decryption unit includes:

a line decryption sub-unit for decrypting, using the frame key, one of the pieces of line audio information and one of the pieces of line video information included in the frame information;

a key updating sub-unit for updating the frame key; and a repeat control sub-unit for controlling, until decryption of all of the pieces of line audio information and all of the pieces of line video information has finished, the line decryption sub-unit to decrypt a next piece of line audio information and a next piece of line video information using the updated frame key, and controlling the key updating sub-unit to update the updated frame key again.

15. The video display device of claims 13, wherein the decryption means is operable to be authenticated by the video transmission device with a common calculation module, in generating the frame key, and in decrypting the frame information.

16. The video display device of claim 12, wherein the reception means is further operable to receive a video enable signal that indicates transmission of the digital audio information, and an audio enable signal that indicates transmission of the digital audio information, and the extraction means is further operable to extract the digital video information in a period shown by the video enable signal, and extract the digital audio information in a period shown by the audio enable signal.

17. The video display device of claim 11, wherein the reception means is further operable to receive a multiplex control signal that identifies transmission of the digital audio information and the digital video information, and the extraction means is operable to extract the digital audio information and the digital video information using the multiplex control signal.

18. The video display device of claim 11, wherein the reception means is operable to receive encrypted frame information in which a non-signal period is provided between the digital audio information and the digital video information, and the extraction means is operable to generate, using the non-signal period between the digital audio information and the digital video information, a multiplex control signal that identifies reception of the digital audio information and the digital video information, and extract the digital audio information and the digital video information using the generated multiplex control signal.

* * * * *

UNITED STATES PATENT AND TRADEMARK OFFICE
CERTIFICATE OF CORRECTION

| | | |
|---|---|---|
| PATENT NO. | : 7,359,511 B2 | Page 1 of 1 |
| APPLICATION NO. | : 10/203510 | |
| DATED | : April 15, 2008 | |
| INVENTOR(S) | : Natsume Matsuzaki et al. | |

It is certified that error appears in the above-identified patent and that said Letters Patent is hereby corrected as shown below:

In column 19, claim 1, line 9, please change "frame" to --frame,--.

In column 19, claim 2, line 38, please change "audio," to --audio--.

In column 20, claim 8, line 29, please change "claims" to --claim--.

Signed and Sealed this

Twenty-sixth Day of August, 2008

JON W. DUDAS
*Director of the United States Patent and Trademark Office*